(12) United States Patent
Johnson et al.

(10) Patent No.: US 7,264,716 B2
(45) Date of Patent: Sep. 4, 2007

(54) MEMBRANE FILTRATION MANIFOLD SYSTEM

(75) Inventors: Warren Thomas Johnson, Grose Vale (AU); Gary William Stollery, Richmond (AU); Bruce Gregory Biltoft, Chatswood (AU); David John Cox, Penrith (AU); Robert James McMahon, Leichhardt (AU); David Wood, Hunters Hill (AU); Leon Keith Ernst, Drummoyne (AU)

(73) Assignee: Siemens Water Technologies Corp., Warrendale, PA (US)

( * ) Notice: Subject to any disclaimer, the term of this patent is extended or adjusted under 35 U.S.C. 154(b) by 0 days.

(21) Appl. No.: 10/718,756

(22) Filed: Nov. 20, 2003

(65) Prior Publication Data

US 2004/0238431 A1    Dec. 2, 2004

Related U.S. Application Data

(63) Continuation of application No. 10/045,186, filed on Oct. 18, 2001, now abandoned, which is a continuation of application No. PCT/AU00/00352, filed on Apr. 20, 2000.

(30) Foreign Application Priority Data

Apr. 20, 1999   (AU)   ..................... PP9850

(51) Int. Cl.
*B01D 35/30*   (2006.01)
*B01D 25/02*   (2006.01)
*B01D 63/02*   (2006.01)
*B01D 63/00*   (2006.01)

(52) U.S. Cl. ............... 210/232; 210/500.23; 210/440; 210/450; 210/428; 210/427; 210/321.88; 210/446; 210/447; 210/321.79; 210/252; 210/254; 210/253

(58) Field of Classification Search ............... 210/253, 210/232, 254, 252, 321.6, 321.79, 321.88, 210/446, 447, 427, 428, 440, 450, 500.13
See application file for complete search history.

(56) References Cited

U.S. PATENT DOCUMENTS 3,228,876 A    1/1966  Mahon (Continued)

FOREIGN PATENT DOCUMENTS

DE    4 117 422    11/1992

(Continued)

OTHER PUBLICATIONS

Almulla et al., Desalination 153 (2002) 237-243.

(Continued)

*Primary Examiner*—Krishnan S. Menon

(57) ABSTRACT

A membrane filtration manifold for connecting a filter submodule including one or more elongate bundles of semipermeable polymeric fibers is provided. The manifold includes a housing and connecting collar connected with said housing. The collar is adapted to receive and locate the submodule, where the submodule has a connecting sleeve with a locking formation. The submodule can be secured at one end to the collar by a clip adapted to engage both the collar and the locking formation to prevent axial withdrawal of the submodule from the collar. Also disclosed is a membrane filtration apparatus including a filter submodule including one or more elongate bundles of semipermeable polymeric fibers. The apparatus further includes a membrane filtration manifold removably connected at one end of said filter submodule and a basepiece removably connected to the other end of said filter submodule.

20 Claims, 16 Drawing Sheets

U.S. PATENT DOCUMENTS

| | | | |
|---|---|---|---|
| 3,693,406 A | 9/1972 | Tobin | |
| 3,708,071 A | 1/1973 | Crowley | |
| 3,968,192 A | 7/1976 | Hoffman et al. | |
| 3,992,301 A | 11/1976 | Shippey et al. | |
| 4,107,043 A * | 8/1978 | McKinney | 210/232 |
| 4,188,817 A | 2/1980 | Steigelmann | |
| 4,192,750 A | 3/1980 | Elfes et al. | |
| 4,193,780 A | 3/1980 | Cotton et al. | |
| 4,218,324 A | 8/1980 | Hartmann et al. | |
| 4,248,648 A | 2/1981 | Kopp | |
| 4,384,474 A | 5/1983 | Kowalski | |
| 4,385,150 A | 5/1983 | Miyake et al. | |
| 4,451,369 A | 5/1984 | Sekino et al. | |
| 4,511,471 A | 4/1985 | Müller | |
| 4,540,490 A | 9/1985 | Shibata et al. | |
| 4,547,289 A | 10/1985 | Okano et al. | |
| 4,609,465 A | 9/1986 | Miller | |
| 4,614,109 A | 9/1986 | Hoffmann | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |
| 4,650,586 A | 3/1987 | Ellis | |
| 4,656,865 A | 4/1987 | Callan | |
| 4,660,411 A | 4/1987 | Reid | |
| 4,670,145 A | 6/1987 | Edwards | |
| 4,673,507 A | 6/1987 | Brown | |
| 4,687,561 A | 8/1987 | Kunz | |
| 4,688,511 A | 8/1987 | Gerlach et al. | |
| 4,718,270 A | 1/1988 | Storr | |
| 4,744,240 A | 5/1988 | Reichelt | |
| 4,756,875 A | 7/1988 | Tajima et al. | |
| 4,763,612 A | 8/1988 | Iwanami | |
| 4,767,539 A | 8/1988 | Ford | |
| 4,779,448 A | 10/1988 | Gogins | |
| 4,781,831 A | 11/1988 | Goldsmith | |
| 4,784,771 A | 11/1988 | Wathen et al. | |
| 4,793,932 A | 12/1988 | Ford et al. | |
| 4,797,211 A | 1/1989 | Ehrfeld et al. | |
| 4,810,384 A | 3/1989 | Fabre | |
| 4,812,235 A | 3/1989 | Seleman et al. | |
| 4,816,160 A | 3/1989 | Ford et al. | |
| 4,839,048 A * | 6/1989 | Reed et al. | 210/450 |
| 4,846,970 A | 7/1989 | Bertelsen et al. | |
| 4,876,006 A | 10/1989 | Ohkubo et al. | |
| 4,876,012 A | 10/1989 | Kopp et al. | |
| 4,921,610 A | 5/1990 | Ford et al. | |
| 4,931,186 A | 6/1990 | Ford et al. | |
| 4,935,143 A | 6/1990 | Kopp et al. | |
| 4,999,038 A | 3/1991 | Lundberg | |
| 5,005,430 A | 4/1991 | Kibler et al. | |
| 5,024,762 A | 6/1991 | Ford et al. | |
| 5,066,375 A | 11/1991 | Parsi et al. | |
| 5,066,401 A | 11/1991 | Muller et al. | |
| 5,066,402 A | 11/1991 | Anselme et al. | |
| 5,069,065 A | 12/1991 | Sprunt et al. | |
| 5,076,925 A | 12/1991 | Roesink et al. | |
| 5,079,272 A | 1/1992 | Allegrezza et al. | |
| 5,094,750 A | 3/1992 | Kopp et al. | |
| 5,104,535 A | 4/1992 | Cote et al. | |
| 5,104,546 A | 4/1992 | Filson et al. | |
| H1045 H | 5/1992 | Wilson | |
| 5,137,631 A | 8/1992 | Eckman et al. | |
| 5,138,870 A | 8/1992 | Lyssy | |
| 5,151,191 A | 9/1992 | Sunaoka et al. | |
| 5,151,193 A | 9/1992 | Grobe et al. | |
| 5,158,721 A | 10/1992 | Allegrezza et al. | |
| 5,182,019 A | 1/1993 | Cote et al. | |
| 5,192,456 A | 3/1993 | Ishida et al. | |
| 5,194,149 A | 3/1993 | Selbie et al. | |
| 5,198,116 A | 3/1993 | Comstock et al. | |
| 5,209,852 A | 5/1993 | Sunaoka et al. | |
| 5,211,823 A | 5/1993 | Giuffrida et al. | |
| 5,221,478 A | 6/1993 | Dhingra et al. | |
| 5,227,063 A | 7/1993 | Langerak et al. | |
| 5,248,424 A | 9/1993 | Cote et al. | |
| 5,297,420 A | 3/1994 | Gilliland et al. | |
| 5,320,760 A | 6/1994 | Freund et al. | |
| 5,353,630 A | 10/1994 | Soda et al. | |
| 5,361,625 A | 11/1994 | Ylvisaker | |
| 5,364,527 A | 11/1994 | Zimmermann et al. | |
| 5,389,260 A | 2/1995 | Hemp | |
| 5,401,401 A | 3/1995 | Hickok | |
| 5,403,479 A | 4/1995 | Smith et al. | |
| 5,405,528 A | 4/1995 | Selbie et al. | |
| 5,417,101 A | 5/1995 | Weich | |
| 5,419,816 A | 5/1995 | Sampson et al. | |
| 5,470,469 A | 11/1995 | Eckman | |
| 5,477,731 A | 12/1995 | Mouton | |
| 5,480,553 A | 1/1996 | Yamamori et al. | |
| 5,531,848 A | 7/1996 | Brinda et al. | |
| 5,531,900 A | 7/1996 | Raghaven et al. | |
| 5,543,002 A | 8/1996 | Brinda et al. | |
| 5,554,283 A | 9/1996 | Brinda et al. | |
| 5,607,593 A | 3/1997 | Cote et al. | |
| 5,639,373 A | 6/1997 | Mahendran et al. | |
| 5,643,455 A | 7/1997 | Kopp et al. | |
| D396,046 S | 7/1998 | Scheel et al. | |
| 5,783,083 A | 7/1998 | Henshaw et al. | |
| D396,726 S | 8/1998 | Sadr et al. | |
| D400,890 S | 11/1998 | Gambardella | |
| 5,895,570 A * | 4/1999 | Liang | 210/232 |
| 5,910,250 A | 6/1999 | Mahendran et al. | |
| 5,914,039 A | 6/1999 | Mahendran | |
| 5,918,264 A | 6/1999 | Drummond et al. | |
| 5,942,113 A | 8/1999 | Morimura | |
| 5,944,997 A | 8/1999 | Pedersen et al. | |
| 6,017,451 A * | 1/2000 | Kopf | 210/232 |
| 6,024,872 A | 2/2000 | Mahendran | |
| 6,039,872 A | 3/2000 | Wu et al. | |
| 6,042,677 A | 3/2000 | Mahendran et al. | |
| 6,048,454 A | 4/2000 | Jenkins | |
| 6,048,455 A * | 4/2000 | Janik | 210/232 |
| 6,077,435 A | 6/2000 | Beck et al. | |
| 6,083,393 A | 7/2000 | Wu et al. | |
| 6,146,747 A | 11/2000 | Wang et al. | |
| 6,156,200 A | 12/2000 | Zha et al. | |
| 6,159,373 A | 12/2000 | Beck et al. | |
| 6,193,890 B1 | 2/2001 | Pederson et al. | |
| 6,202,475 B1 | 3/2001 | Selbie et al. | |
| 6,245,239 B1 | 6/2001 | Cote et al. | |
| 6,254,773 B1 | 7/2001 | Biltoft | |
| 6,294,039 B1 | 9/2001 | Mahendran et al. | |
| RE37,549 E | 2/2002 | Mahendran et al. | |
| 6,354,444 B1 | 3/2002 | Mahendran | |
| 6,440,303 B2 | 8/2002 | Spriegel | |
| D462,699 S | 9/2002 | Johnson et al. | |
| 6,524,481 B2 | 2/2003 | Zha et al. | |
| 6,550,747 B2 | 4/2003 | Rabie et al. | |
| 6,555,005 B1 | 4/2003 | Zha et al. | |
| D478,913 S | 8/2003 | Johnson et al. | |
| 6,620,319 B2 | 9/2003 | Behmann et al. | |
| 6,641,733 B2 | 11/2003 | Zha et al. | |
| 6,645,374 B2 | 11/2003 | Cote et al. | |
| 2001/0027951 A1 | 10/2001 | Gungerich et al. | |
| 2002/0148767 A1 | 10/2002 | Johnson et al. | |
| 2002/0153299 A1 | 10/2002 | Mahendran et al. | |
| 2002/0195390 A1 | 12/2002 | Zha et al. | |
| 2003/0075504 A1 | 4/2003 | Zha et al. | |
| 2003/0089659 A1 | 5/2003 | Zha et al. | |
| 2003/0136746 A1 | 7/2003 | Behman et al. | |
| 2003/0141248 A1 | 7/2003 | Mahendran et al. | |
| 2003/0164332 A1 | 9/2003 | Mahendran et al. | |
| 2003/0178365 A1 | 9/2003 | Zha et al. | |

| | | | |
|---|---|---|---|
| 2003/0205519 A1 | 11/2003 | Zha et al. | |
| 2003/0226797 A1 | 12/2003 | Phelps | |
| 2003/0234221 A1 | 12/2003 | Johnson et al. | |
| 2004/0000520 A1 | 1/2004 | Gallagher et al. | |

FOREIGN PATENT DOCUMENTS

| | | |
|---|---|---|
| EP | 0 463 627 B1 | 5/1995 |
| EP | 0 763 758 A1 | 10/1996 |
| EP | 0 911 073 | 4/1999 |
| EP | 1 052 012 A1 | 11/2000 |
| EP | 920 904 A1 | 12/2000 |
| FR | 2 674 448 A1 | 2/1992 |
| GB | 2 253 572 A | 9/1992 |
| JP | 58-088007 | 5/1983 |
| JP | 61-097006 | 5/1986 |
| JP | 61-107905 | 5/1986 |
| JP | 61-192309 | 8/1986 |
| JP | 61-257203 | 11/1986 |
| JP | 61-263605 | 11/1986 |
| JP | 62-004408 | 1/1987 |
| JP | 62-114609 | 5/1987 |
| JP | 62-140607 | 6/1987 |
| JP | 62-179540 | 8/1987 |
| JP | 63-097634 | 4/1988 |
| JP | 63-143905 | 6/1988 |
| JP | 01-307409 | 12/1989 |
| JP | 63-180254 | 2/1990 |
| JP | 02-164423 | 6/1990 |
| JP | 02-284035 | 11/1990 |
| JP | 03-018373 | 1/1991 |
| JP | 03-028797 | 2/1991 |
| JP | 31-010445 | 5/1991 |
| JP | 04-310223 | 11/1992 |
| JP | 08-023557 | 2/1993 |
| JP | 05-157654 | 6/1993 |
| JP | 06-071120 | 3/1994 |
| JP | 06-114240 | 4/1994 |
| JP | 06-343837 | 12/1994 |
| JP | 07-000770 | 1/1995 |
| JP | 07-185268 | 7/1995 |
| JP | 07-275665 | 10/1995 |
| JP | 08-010585 | 1/1996 |
| JP | 09-141063 | 6/1997 |
| JP | 10-156149 | 6/1998 |
| WO | WO90/00434 | 1/1990 |
| WO | WO91/16124 | 10/1991 |
| WO | WO93/02779 | 2/1993 |
| WO | WO96/07470 | 3/1996 |
| WO | WO96/41676 | 12/1996 |
| WO | WO98/22204 | 5/1998 |
| WO | WO99 59707 | 11/1999 |
| WO | WO 01/36075 | 5/2001 |

OTHER PUBLICATIONS

Rosenberger et al., Desalination 151 (2002) 195-200.
Cote et al., Wat. Sci. Tech. 38(4-5) (1998) 437-442.

* cited by examiner

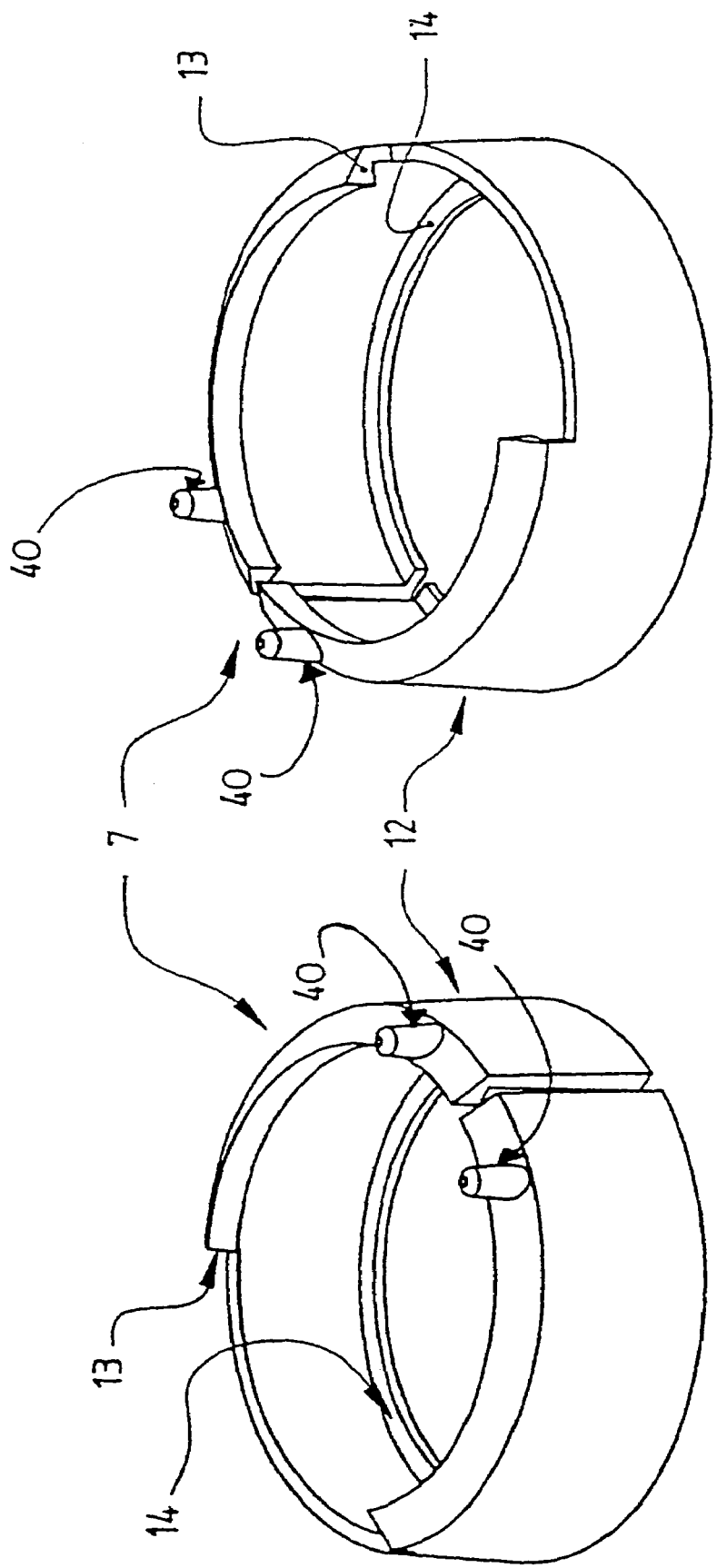

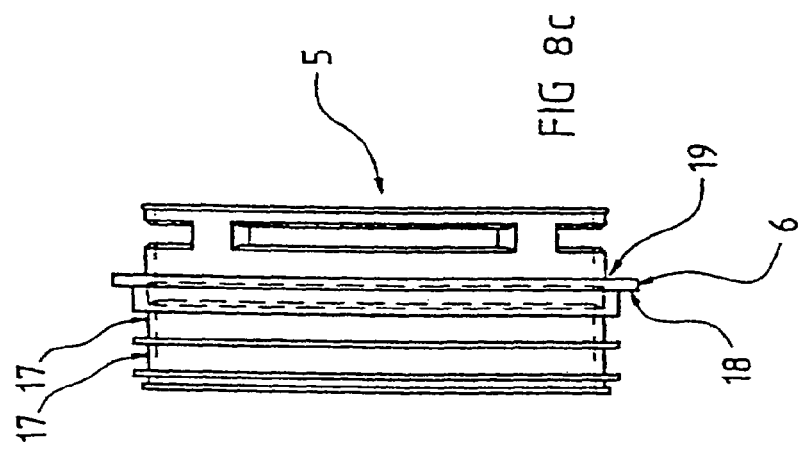
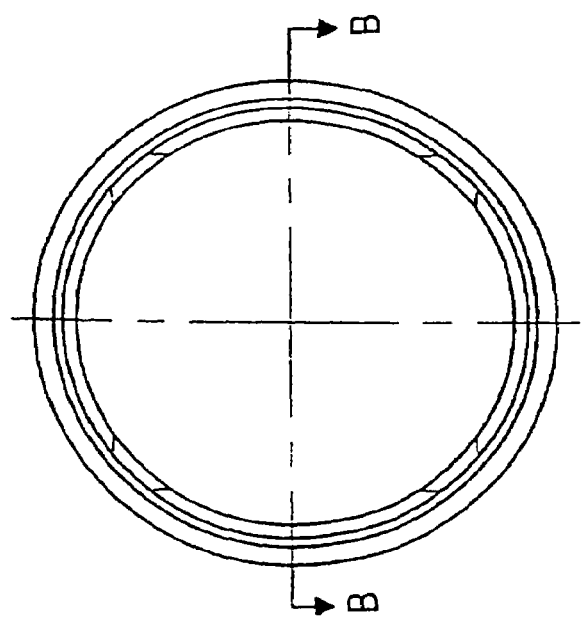
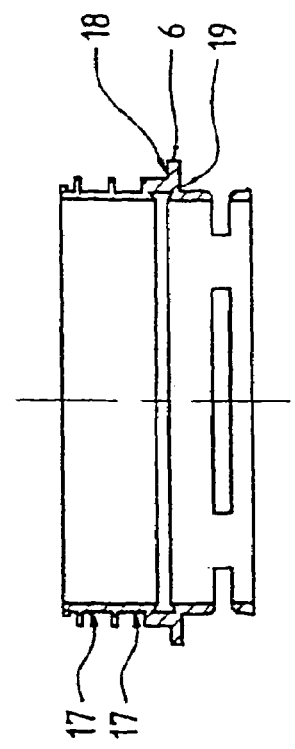

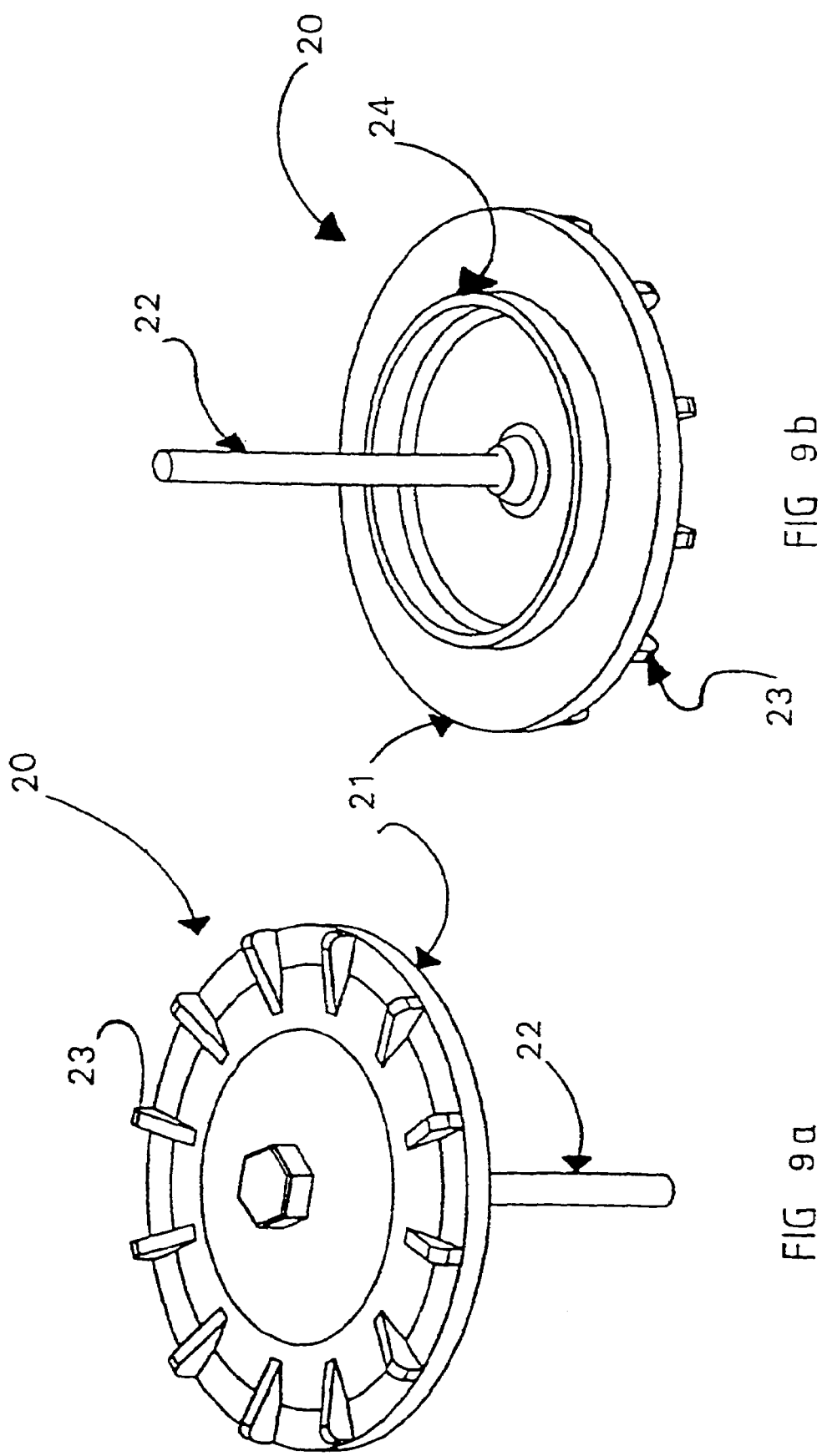

MEMBRANE FILTRATION MANIFOLD SYSTEM

RELATED APPLICATIONS

This application is a continuation of U.S. application Ser. No. 10/045,186, filed Oct. 18, 2001, now abandoned which is a continuation, under 35 U.S.C. § 120, of PCT International Application No. PCT/AU00/00352 which has an International filing date of Apr. 20, 2000, which designated the United States of America, which was published by the International Bureau in English on Oct. 26, 2000, and which claims the benefit of Australian Provisional Application No. PP 9850 filed Apr. 20, 1999.

FIELD OF THE INVENTION

The present invention relates to membrane filtration manifold systems. More particularly the invention relates to membrane filtration manifold systems for hollow fibre membrane filters comprising elongate bundles of hollow fibre membranes, wherein feed to be filtered is fed to the outside of the bundles of fibres and filtrate is extracted from the end or ends of the fibre lumens. The systems also preferably incorporate a cleaning facility for periodic cleansing of the feed surfaces of the fibres.

The invention has been developed primarily for use in a membrane filtration system which is open to atmospheric pressure and will be described hereinafter with reference to this application. However, it will be appreciated that the invention is not limited to this particular field of use.

BACKGROUND OF THE INVENTION

Typical prior art filtration manifolds are employed in filtration systems of the type described above. These filtration systems generally include elongate tubular cartridges enclosing a bundle of the hollow fibre membranes. Manifold or header arrangements are used to connect the cartridges, usually at one or both ends, these manifolds acting to separate and divert the respective flows of the contaminated feed filtrate and cleaning fluid through the system. In this regard, cross-flow systems typically have two feed manifolds (inlet and re-circulation outlet) and one or two filtrate manifolds. In cross-flow filtration systems of the prior art the feed stream to be filtered flows tangential to or across the surface of the membrane. This generates a sweeping action at the membrane surface, keeping the surface cleaner. Conversely, systems configured for dead end operations utilise only one feed inlet manifold and one filtrate outlet manifold during filtration mode. Further, these prior art manifolds or header arrangements are often configured to facilitate the construction of modular two or three dimensional cartridge arrays.

Most typically, the prior art filtration systems, as previously described, are closed to the atmosphere. In such systems, fluid to be filtered, hereinafter referred to as feed, is fed under positive pressure to the filters. In order for this type of system to operate effectively, the elongate tubular filtration cartridges are encased in pressure tight housings. Such housings are then connected to a manifold system which both separates the feed from the filtrate and supports the pressure tight housing. The manifold system may also serve to introduce cleaning fluid to the filtration system.

Prior art filtration systems, as previously described, may also be open to the atmosphere. Typically in such systems, feed is drawn through the membranes under negative pressure. This is achieved by applying a negative, or suction, pressure on the filtrate side of the membrane. Such systems tend to employ less infrastructure and capital works compared with systems closed to the atmosphere as they do not require components that are able to contain relatively higher pressures. For example, there is no need to encase filtration cartridges in individual pressure tight housings in systems open to atmosphere. Typically in these systems, the filtration cartridges are merely substantially immersed in an open tank containing the feed. In such systems it is desirable that an appropriate manifold be provided to both support the filter cartridges and to allow the filtrate to be drawn from the filter while separating the feed from the filtrate. Similarly, as with closed systems, such a manifold may also serve the purpose of supporting a cleaning fluid system.

Prior art filtration systems and their associated filtration cartridges referred to above are often a complex configuration of pipes and parts which are difficult and time consuming to assemble. Further more, the actual manifold system components of the prior art filtration systems are often a complex assembly of parts in themselves.

The prior art filtration systems described above also require regular testing to assess system integrity. Non-integrity may be due to failure of individual filtration membrane hollow fibres, 'o'-rings or other system components. Integrity testing often requires the removal of either individual system components or filtration cartridges. This removal is often difficult in typical prior art filtration manifolds. Furthermore, as previously discussed, typical prior art filtration manifolds may contain many complex parts. It then follows that integrity testing of these parts can also be time consuming.

It is an object of the present invention to provide a filtration manifold system of the kind herein described which overcomes or ameliorates at least some of the deficiencies of the prior art or at least offers a useful alternative thereto.

SUMMARY OF THE INVENTION

According to one aspect of the invention there is provided a membrane filtration manifold for connecting a filter submodule of the kind including one or more elongate bundles of semipermeable polymeric fibres, said manifold including: a housing; and at least one submodule connecting collar connected with said housing, said collar being adapted to receive and locate said submodule having a connecting sleeve with a locking formation whereby the submodule can be secured at one end with the collar by a clip means adapted to engage both said collar and said locking formation to prevent axial withdrawal of said submodule from said collar.

Preferably, said locking formation includes a circumferential flange formed on said sleeve.

Also, in a preferred form, the housing and collars of the manifold include passageways for fluid communication between the housing and collars. Further preferably, the housing includes a removable cap for fluid-tight sealing engagement with the housing.

According to a second aspect of the invention there is provided a membrane filtration apparatus including: a filter submodule of the kind including one or more elongate bundles of semipermeable polymeric fibres; a headpiece removably connected at one end of said filter submodule; and a basepiece removably connected to the other end of said filter submodule; said headpiece being a membrane filtration manifold according to the first aspect of the invention.

According to a third aspect of the invention there is provided a membrane filtration apparatus bank including: a plurality of membrane filtration apparatuses according to the second aspect of the invention; a filtrate conduit connected to at least one membrane filtration apparatus; and a cleaning fluid conduit connected to at least one membrane filtration apparatus.

Preferably, the module groups are arranged in an upright position, said filtrate conduit being proximally above said headpieces and said cleaning fluid conduit being proximally above said basepieces.

According to a fourth aspect of the invention there is provided a membrane filtration apparatus array including a plurality of membrane filtration apparatus banks according to the third aspect of the invention connected in parallel by an array filtrate conduit.

According to another aspect of the invention there is provided a membrane filtration apparatus array train including: a train conduit; and a plurality of membrane filtration apparatus arrays according to the fourth aspect of the invention connected in fluid communication with said train conduit.

BRIEF DESCRIPTION OF THE DRAWINGS

A preferred embodiment of the invention will now be described, by way of example only, with reference to the accompanying drawings.

FIG. 4a is an isometric view of the preferred embodiment of the clip.

FIG. 4b is an isometric view of the preferred embodiment of the clip of FIG. 4a.

FIG. 5 is a cross sectional side elevation of the locking clip of FIG. 4a.

FIG. 7b is a sectional view of the connecting sleeve of FIG. 8a taken on line A-A of FIG. 7a.

FIG. 7c is a side elevation of the connecting sleeve of FIG. 7a.

FIG. 8a is a plan view of an alternate embodiment of the connecting sleeve for filtration modules.

FIG. 8b is a sectional view of the connecting sleeve of FIG. 8a taken on line B-B of FIG. 8a.

FIG. 8c is a side elevation of the connecting sleeve of FIG. 8a.

FIG. 9a is a perspective view of a cap.

FIG. 9b is another perspective view of the cap of FIG. 9a.

DETAILED DESCRIPTION OF THE PREFERRED EMBODIMENT

Figure 1:
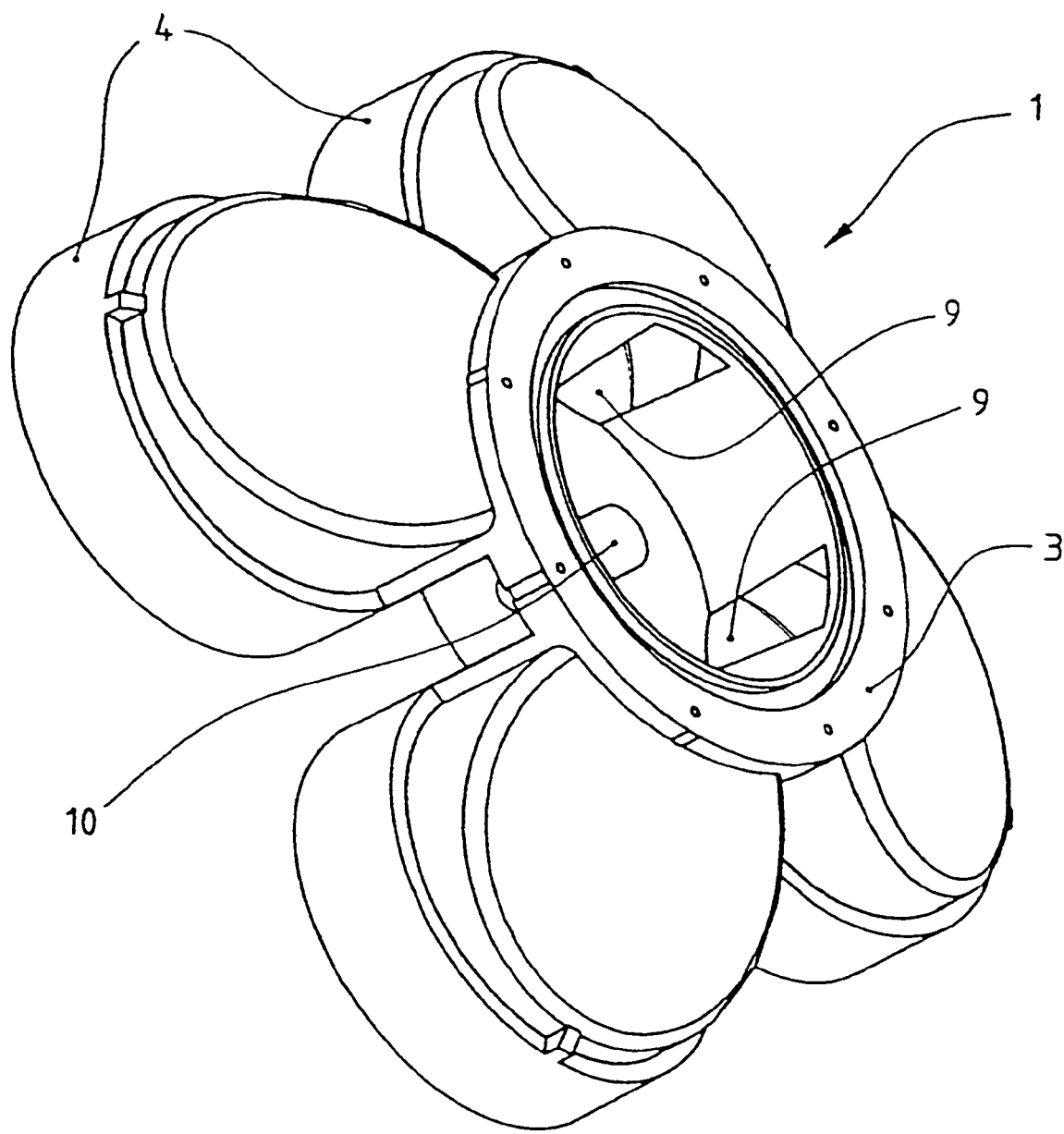
FIG. 1 is a perspective view of a membrane filtration manifold according to the invention.
Figure 2:
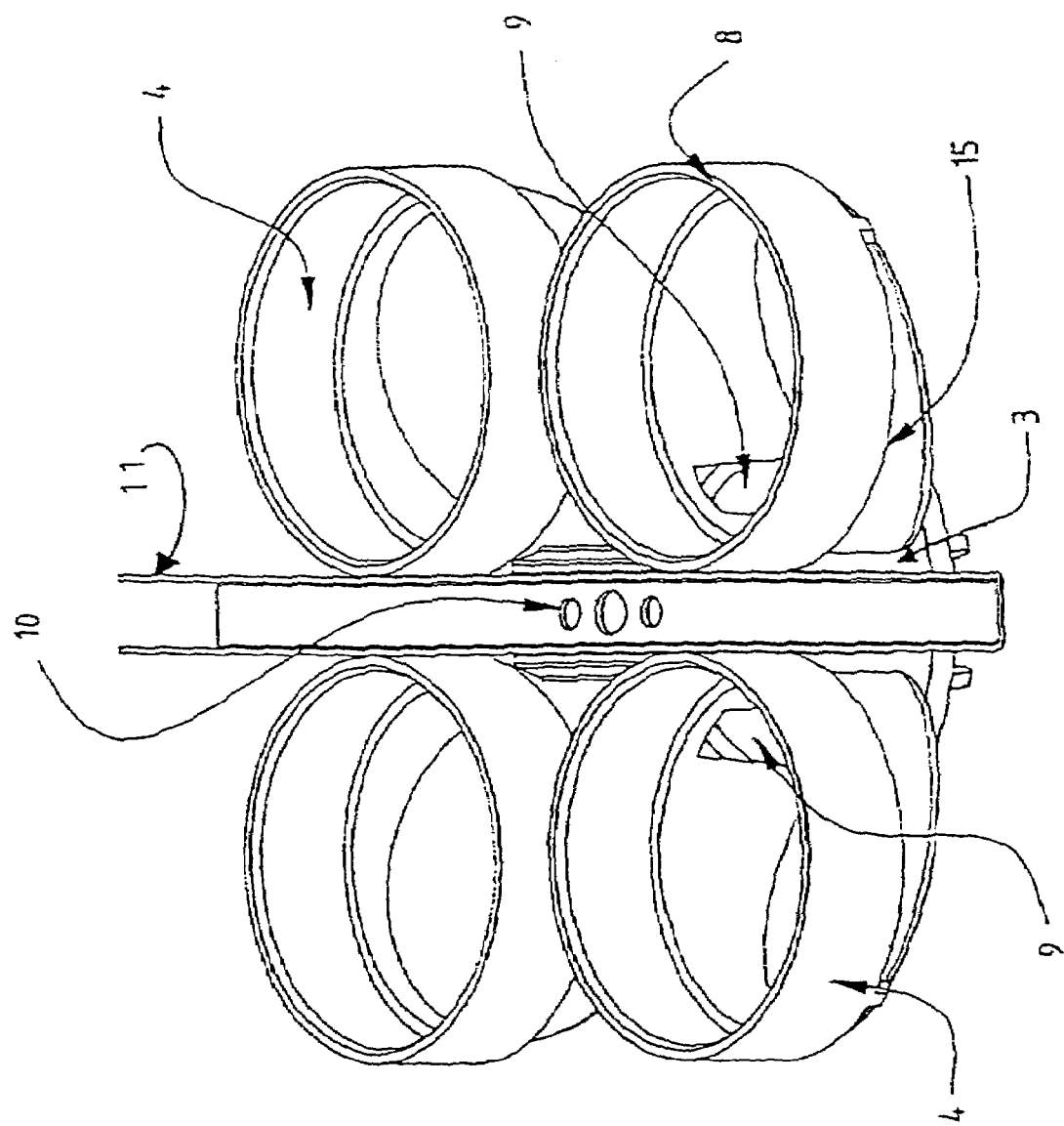
FIG. 2 is another perspective view of the membrane filtration manifold of FIG. 1.

Referring to the drawings, the membrane filtration manifold system includes a membrane filtration manifold 1 for connecting filter submodules 2 of the kind comprising elongate bundles of hollow fibre membranes. As best shown in FIGS. 1 and 2, the preferred embodiment of the manifold includes a housing 3 connected with four submodule connecting collars 4.

Figure 3:
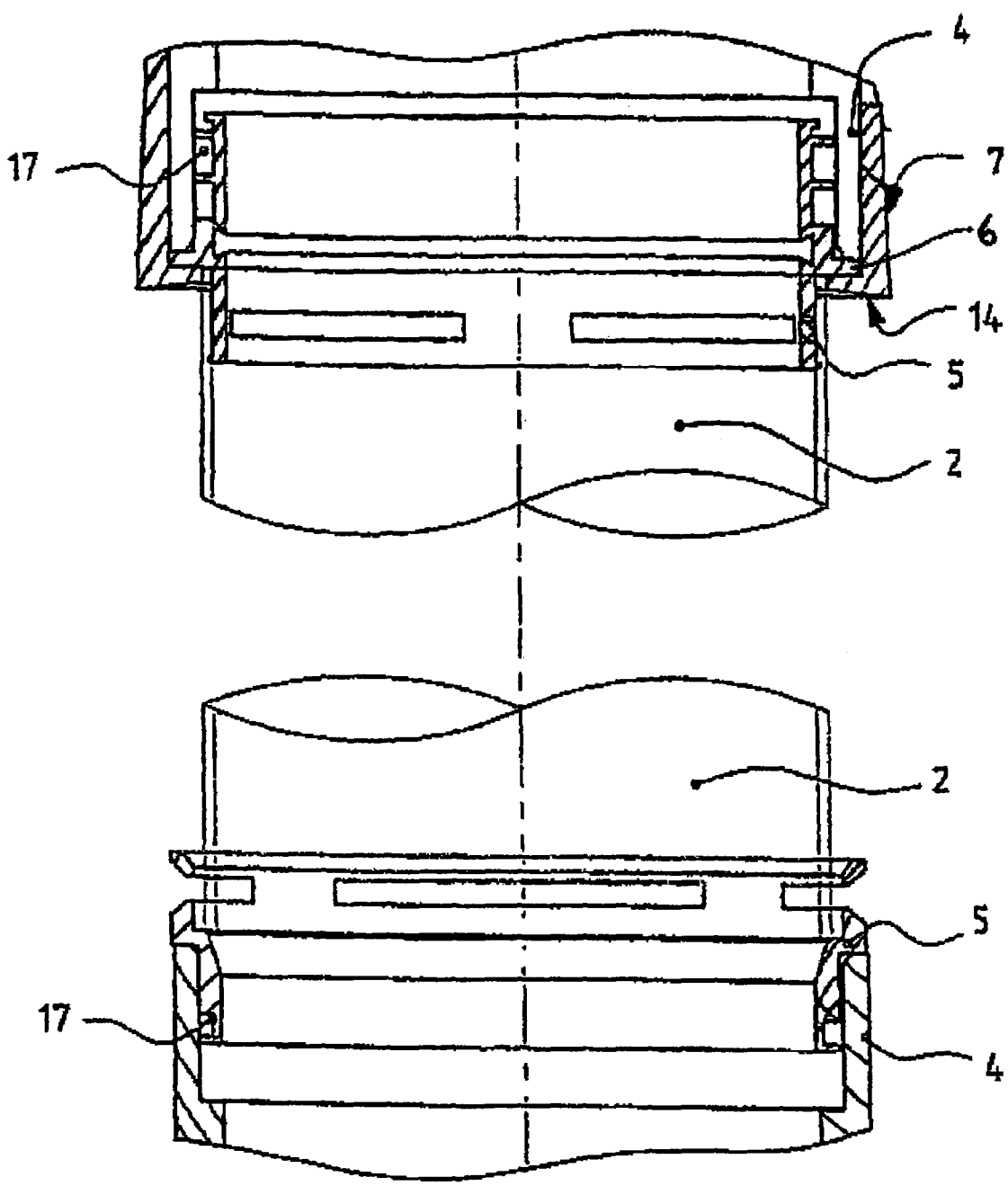
FIG. 3 is a sectional view showing a submodule connected to a manifold collar by a locking clip.

Referring to FIG. 3, the collars 4 are adapted to receive and locate submodules 2 having a connecting sleeve 5 with a locking flange 6. In this embodiment, the submodule 2 can be secured at one end with its respective collar 4 by a clip 7 which simultaneously engages the submodule 2 and locking flange 6 to prevent axial withdrawal of the submodule 2 from the collar 4. The locking flange 6 further engages bearingly with a lip 8 of the collar 4. Engaging and releasing the clip 7 enables substantially simple respective assembly and removal of the submodules 2 from the manifold 1. The manifold 1 further includes filtrate passageways 9 for fluid communication between the housing 3 and collars 4 and cleaning fluid passageways 10 for cleaning fluid communication with a cleaning fluid conduit 11. Conduit 11 communicates with housing 3 through a number of holes or passageways 10 as shown in FIGS. 1, 2, 12a, and 12b. Once fluids enter the housing 3 they pass through passageways 9 into the collar 4, as shown in FIG. 1.

Figure 4C:
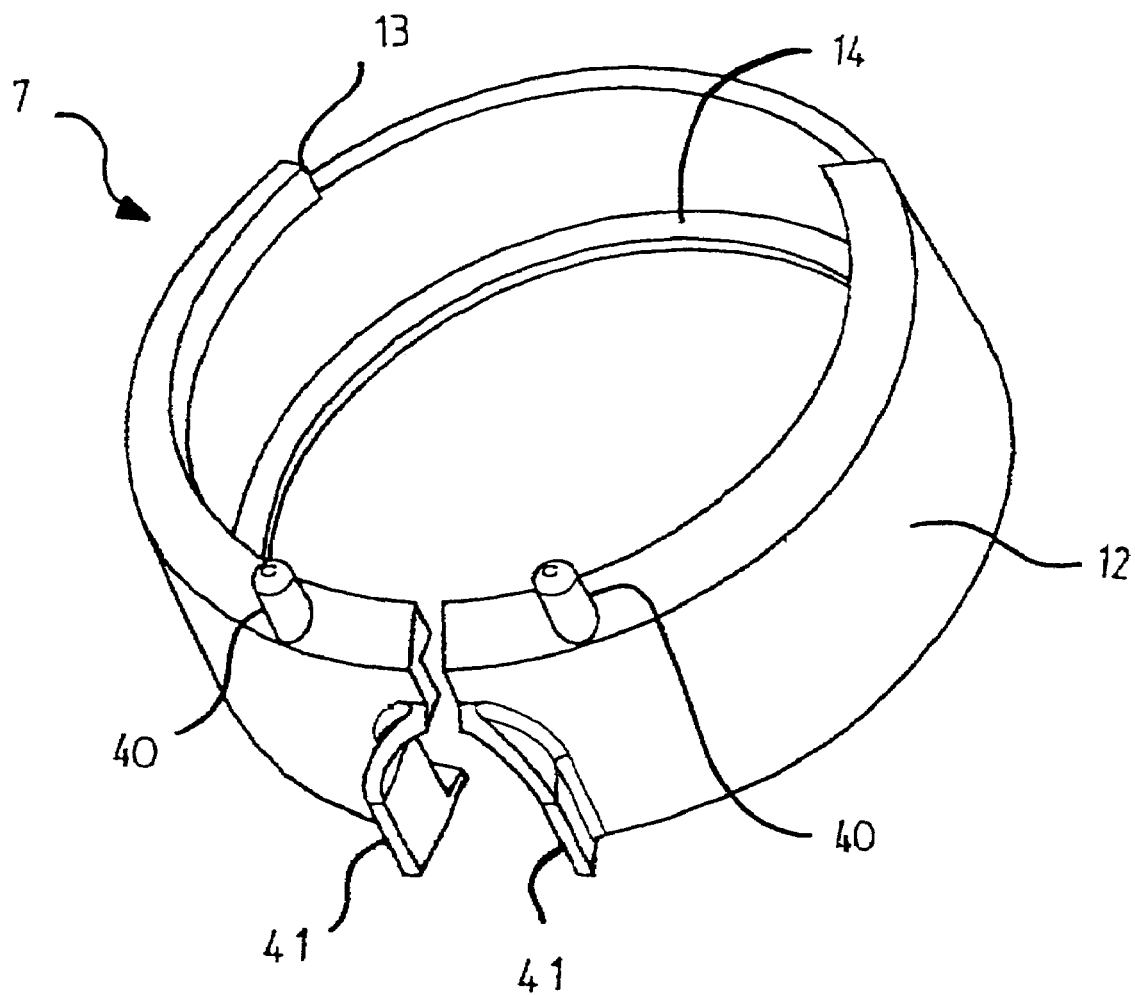
FIG. 4c is an isometric view of an alternate embodiment of the clip.
Figure 5:
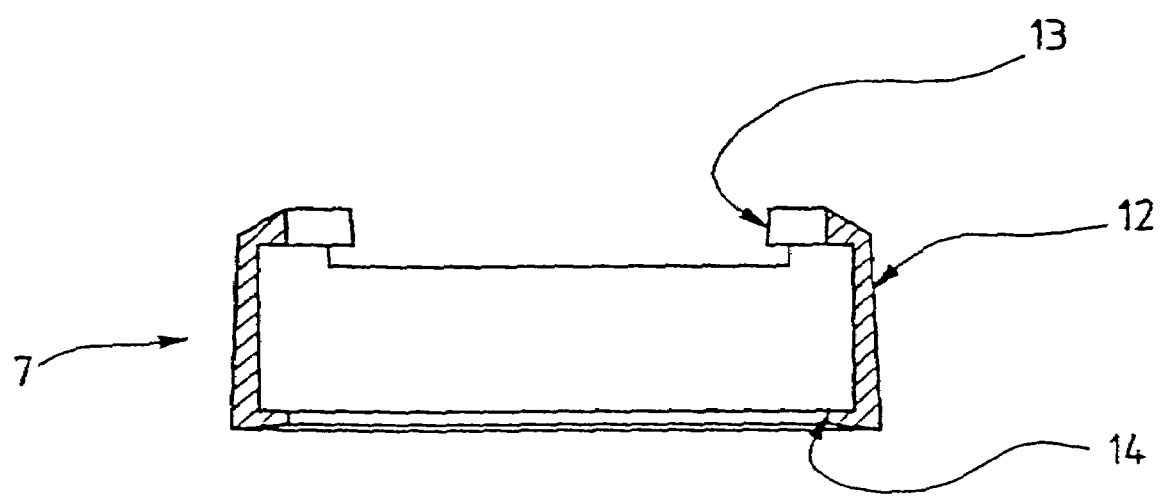
Figure 6B:
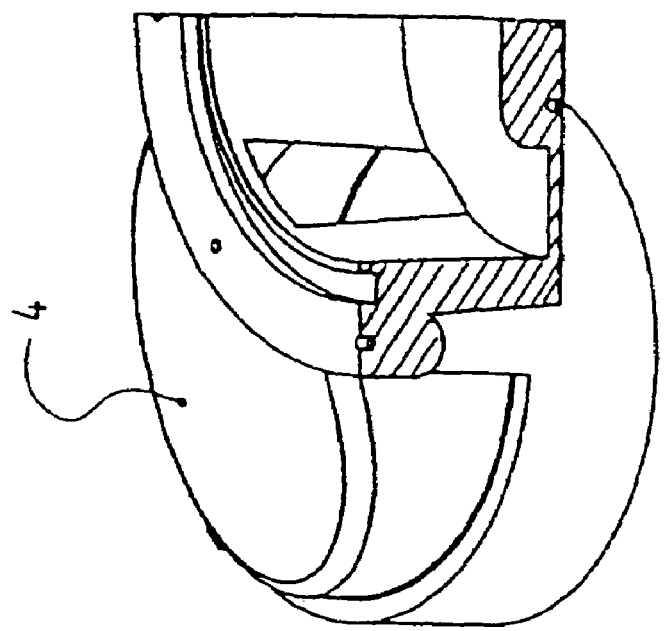
FIG. 6b is another detail view of the collar.
Figure 6A:
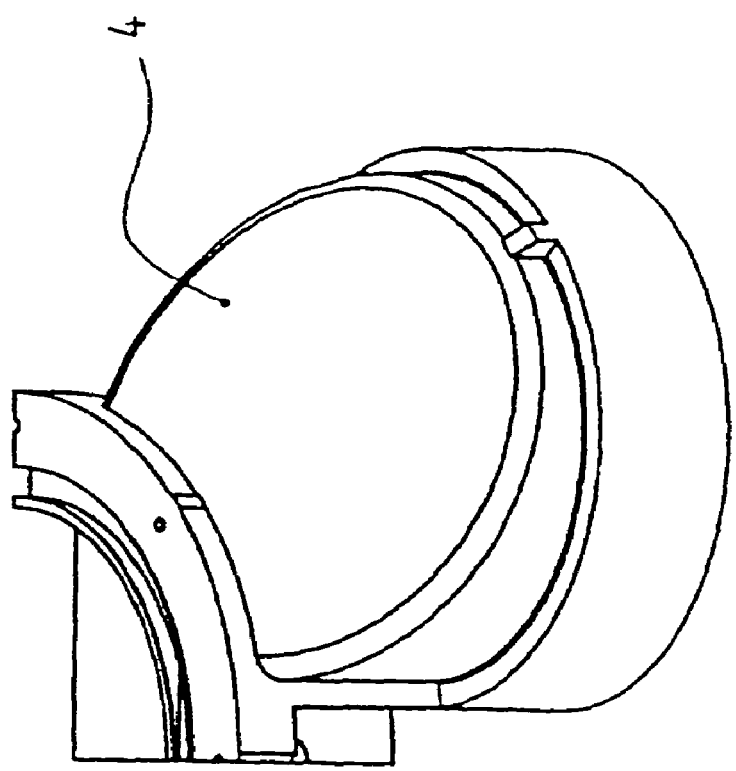
FIG. 6a is a detail view of the collar.
Figure 7C:
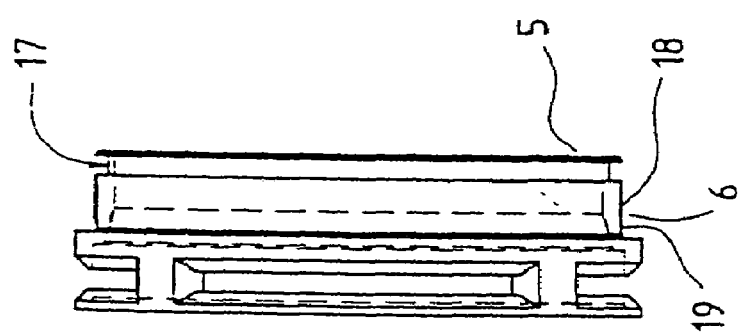
Figure 7A:
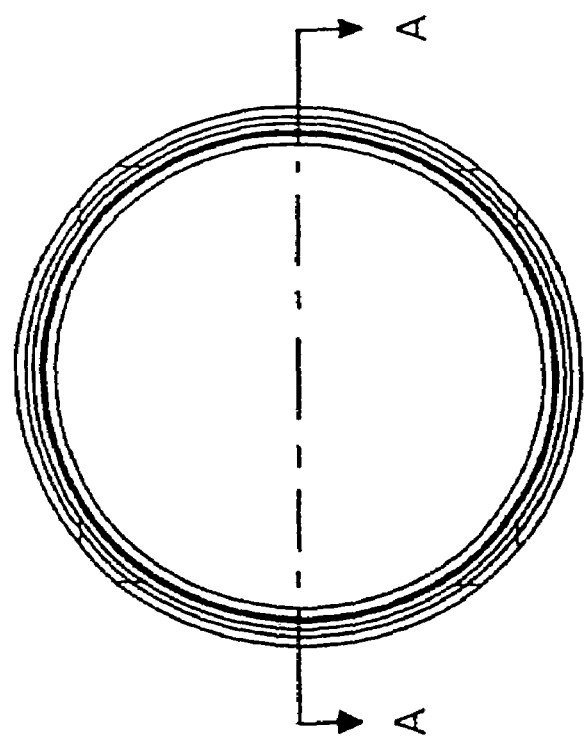
FIG. 7a is a plan view of an embodiment of the connecting sleeve for filtration modules.
Figure 7B:
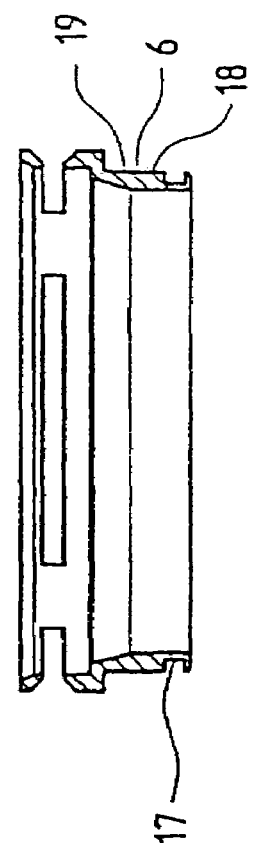

FIGS. 4a, 4b and 5 show the preferred embodiment of the clip 7. The clip 7 has a substantially cylindrical sidewall 12 with a top and bottom flange 13 and 14, each of which projects radially inwardly from the sidewall 12. The clip 7 is split in a line parallel to the central axis of the submodule 2 to allow radial expansion of the clip when slid axially into and out of locking engagement with the collar 4. Radial expansion is achieved by manually parting a pair of projections 40 provided on the top flange 13 of the clip, on either side of the split respectively. Furthermore, the clip 7 is resiliently biased to enable radial contraction of the clip when the clip snap-lockingly engages with both the submodule 2 and collar 4. When the clip is employed to engage both the submodule and the locking flange, bottom flange 14 locks over the submodule flange 6 and top flange 13 bearingly engages with the lip 8. Furthermore, the collar 4 has a stepped seat 15 for locking engagement with top flange 13.

FIG. 4c shows an alternate embodiment of the clip 7. This embodiment has additional projections 41 to aid in the manual removal of the clip 7 from both the submodule 2 and collar 4. The additional projections 41 extend radially from the sidewall 12 of the clip 7, on either side of the split of the sidewall 12.

FIGS. 7a-c and 8a-c show embodiments of the submodule connection sleeves 5. These Figures show detail of the flange 6 and 'o'-ring seat channel 17 features of the connection sleeves 5. One side 18 of the flange 6 is for bearing engagement with the collar 4 and a second side 19 is for locking engagement with the clip 7. Further, the embodiment of the submodule connection sleeve 5 shown in FIGS. 7a-c, has one channel 17 for use as an 'o'-ring seat, while the embodiment of the submodule connection sleeve 5 shown in FIGS. 8a-c, has two channels 17 for use as 'o'-ring seats.

The manifold 1 may also include a removable cap 20, for fluid-tight sealing engagement with the housing. The preferred embodiment of the cap, shown in FIGS. 9a and 9b, includes a disc 21 with an axially extending threaded shaft 22 mounted to its centre on one side. The disc 21 also has projections 23 on the other side to facilitate manual turning of the cap 20. The cap will be described in more detail below. The shaft 22 retains end cap 20 in position. There is no communication of fluid through shaft 22.

Figure 10:
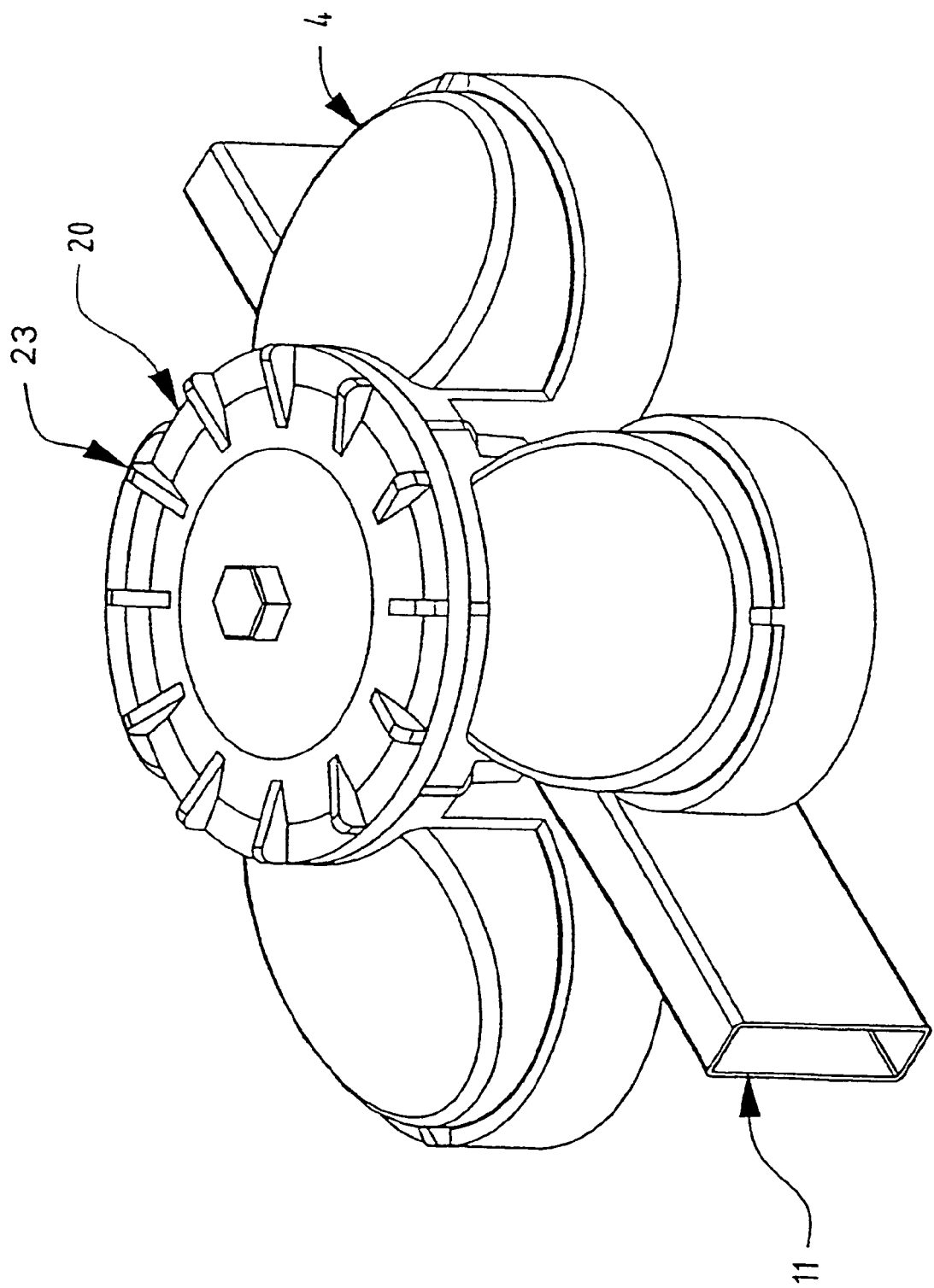
FIG. 10 is a perspective view of the membrane filtration manifold of FIG. 1 showing the cap of FIG. 9a in use.

A radially spaced flange 24 extends axially outwardly from the cap 20 on the same side of the cap as the shaft 22. This flange allows fluid tight sealing engagement of the cap 20 with the housing 1. FIG. 10 shows the preferred embodiment of the cap 20 in use.

Figure 11:
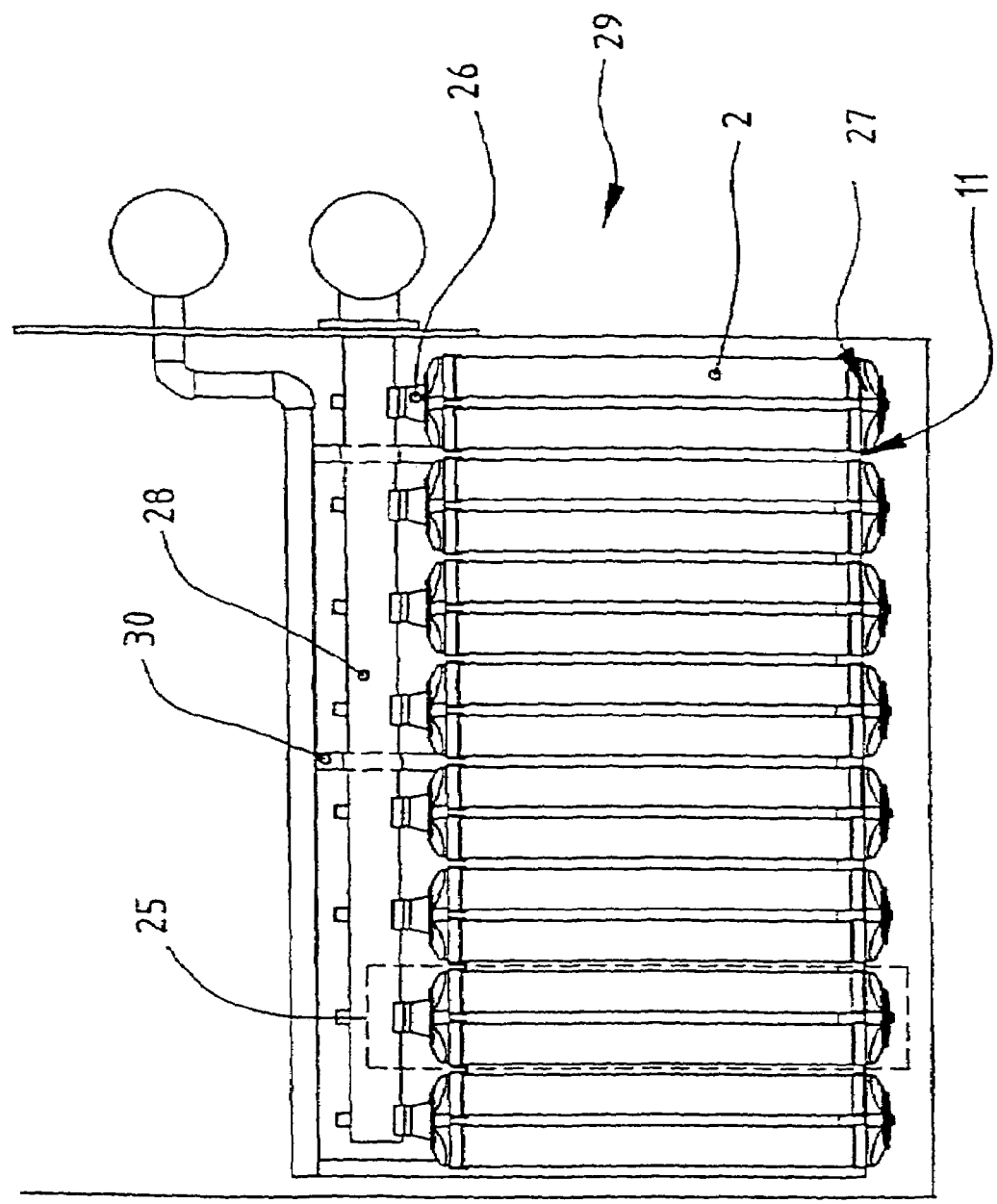
FIG. 11 is a side elevation of a membrane filtration apparatus bank.

In another embodiment of the invention shown in FIG. 11, a membrane filtration apparatus 25 includes a headpiece 26 and a basepiece 27, each being an embodiment of the membrane filtration manifold 1 as described above, and connected to four membrane filter submodules 2. Each headpiece 26 connects to a filtrate conduit 28 allowing fluid communication between each headpiece 26 and the filtrate conduit 28. The cap 20 is not required when the membrane filtration manifold 1 is used as a headpiece 26. Absence of the cap 20 allows fluid communication between the manifold 1 and the filtrate conduit 28. When housing 3 is used as a headpiece, the end cap 20 is removed and filtrate withdrawn through the top of manifold 1 into filtrate conduit 28.

Figure 12A:
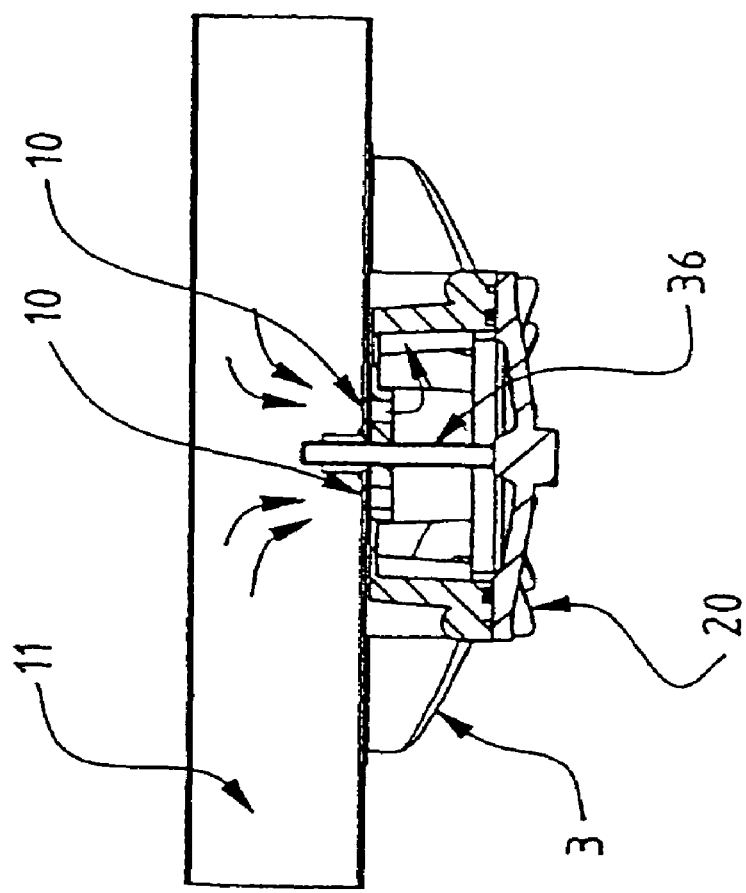
FIG. 12a is a side cross sectional elevation of an embodiment of the membrane filtration manifold in basepiece configuration, showing cleaning fluid flow from the cleaning fluid conduit through the basepiece.
Figure 12B:
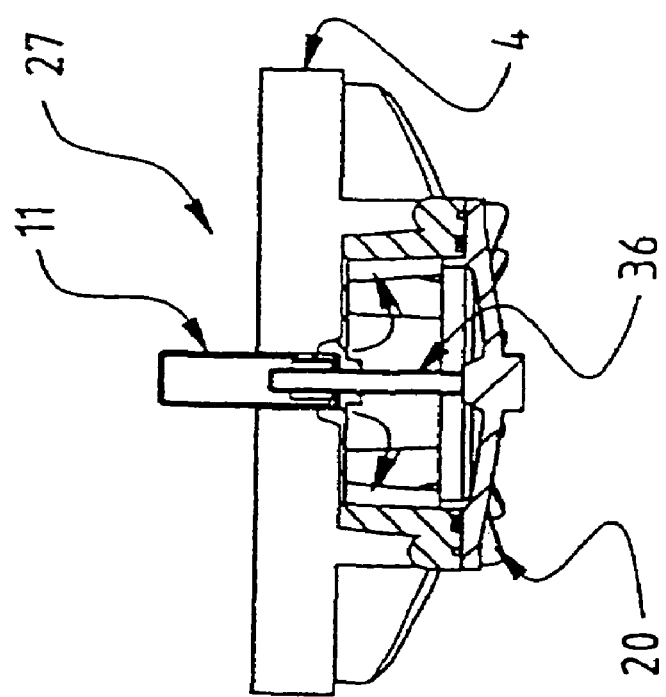
FIG. 12b is a front cross sectional elevation of an embodiment of the membrane filtration manifold in basepiece configuration, showing cleaning fluid flow from the cleaning fluid conduit through the basepiece.

Further, as seen particularly in FIGS. 12a and 12b, each basepiece 27 is connected to a cleaning fluid conduit 11 allowing fluid communication between each basepiece 27 and the cleaning fluid conduit 11. When the membrane filtration manifold 1 is used as a basepiece 27, the threaded shaft 22 of the cap 20 is threadedly engaged with a corresponding bore on the cleaning fluid conduit 11. Also, in the preferred embodiment, the clip 7 is not required to lock the submodule 2 to the basepiece. This is because the submodule 2 will be held in its respective collar 4 of its basepiece 27, both by gravity and by virtue of the top of the submodule being held in place in its headpiece 26 and a clip 7.

In an alternate embodiment of the invention, the shaft 22 is hollow with an internal threaded portion. In this embodiment, rather than threadedly engaging with a bore in the cleaning fluid conduit, the shaft 22 internally threadedly engages with a complementary shaft projecting in a perpendicular direction from the cleaning fluid conduit 11.

In another embodiment of the invention, a membrane filtration apparatus bank 29 includes a plurality of membrane filtration apparatus 25 as described above wherein each headpiece 26 is connected to a filtrate conduit 28 and each basepiece 27 is connected to a cleaning fluid conduit 11. Additional stiffening elements 30, as shown in FIG. 11, may also be provided therebetween to aid physical stability of the filtration system. Typically, there are eight membrane filtration apparatuses 25 in each bank 29 and the apparatuses are arranged in an upright position. When employed in a filtration system, the bank 29 is substantially immersed in the feed, where the feed is contained in a tank 31 with an open top.

Preferably, air is used as the filtration submodule cleaning fluid which flows through the cleaning fluid conduit 11. As best shown in FIGS. 11, 12a and 12b, the cleaning fluid conduit 11 is proximally above the basepieces 27 and lies in a straight line along the length of the bank 29 in between the collars 4. This allows the cleaning fluid conduit 11 to supply air, to the basepieces 27 through a plurality of passageways 10 on the under side of the cleaning fluid conduit 11. Supplying air to the basepieces 27 through the underside of the cleaning fluid conduit 11 allows controlled release of the cleaning air, ensuring it is evenly distributed along the entire length of the bank 29.

Figure 13:
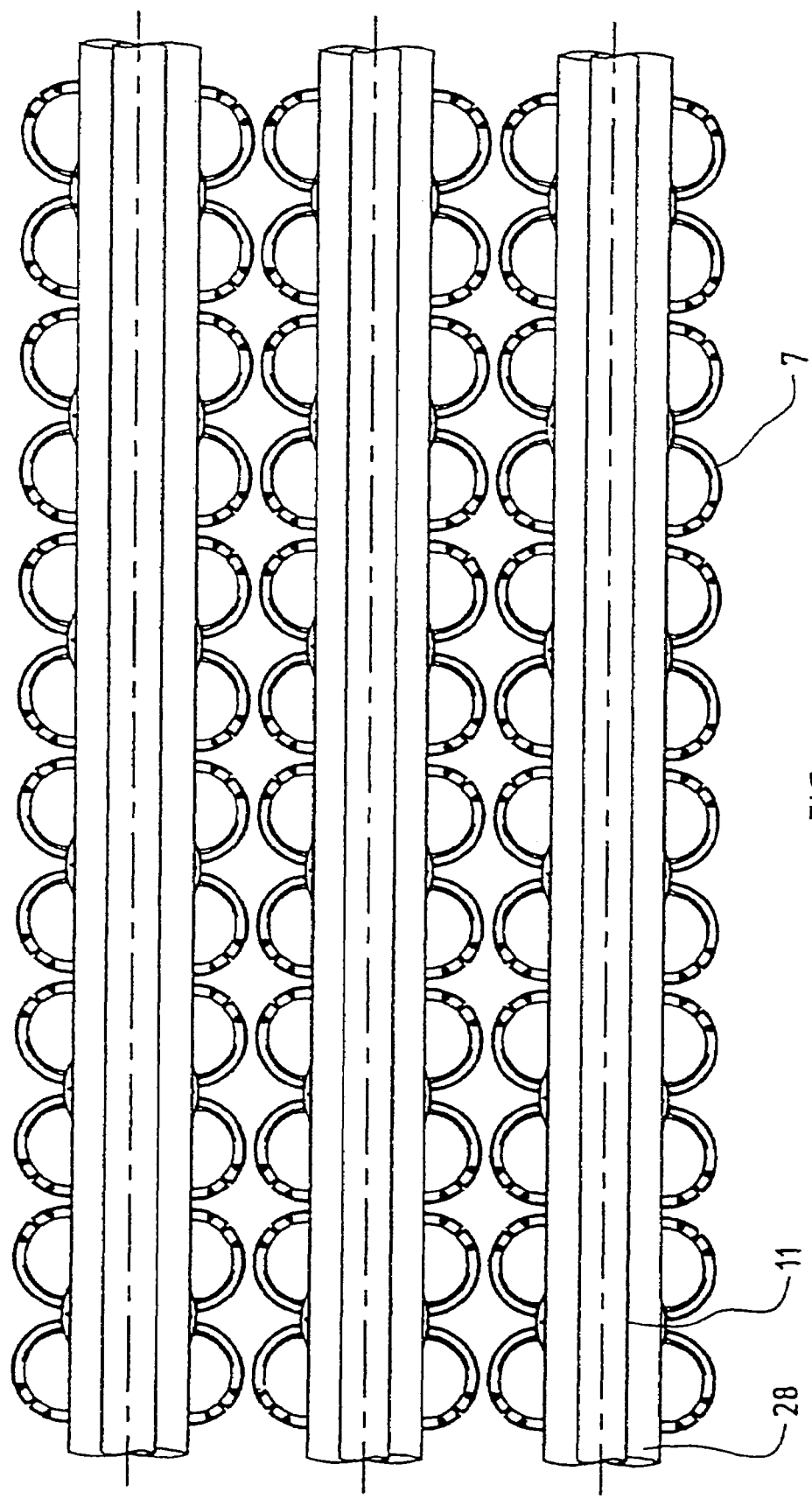
FIG. 13 is a plan view of a membrane filtration apparatus array.

In another embodiment of the invention, the filtration system includes a membrane filtration apparatus array as shown in FIGS. 11 and 13 having a plurality of apparatus banks 29 wherein each of the filtrate conduits 28 are connected to an array filtrate conduit 32.

The filtration apparatus banks 29 are further adapted for relatively simple disconnection from the membrane filtration apparatus array. When disconnected, the filtration apparatus banks may be removed from the membrane filtration apparatus array by lifting the bank vertically from the array. Similarly, the banks may also be placed individually into an array by lowering the banks vertically into its predetermined position. This allows for less complicated assembly and disassembly of the arrays and convenient access to submodules disposed in or near the centre of the array.

Figure 14:
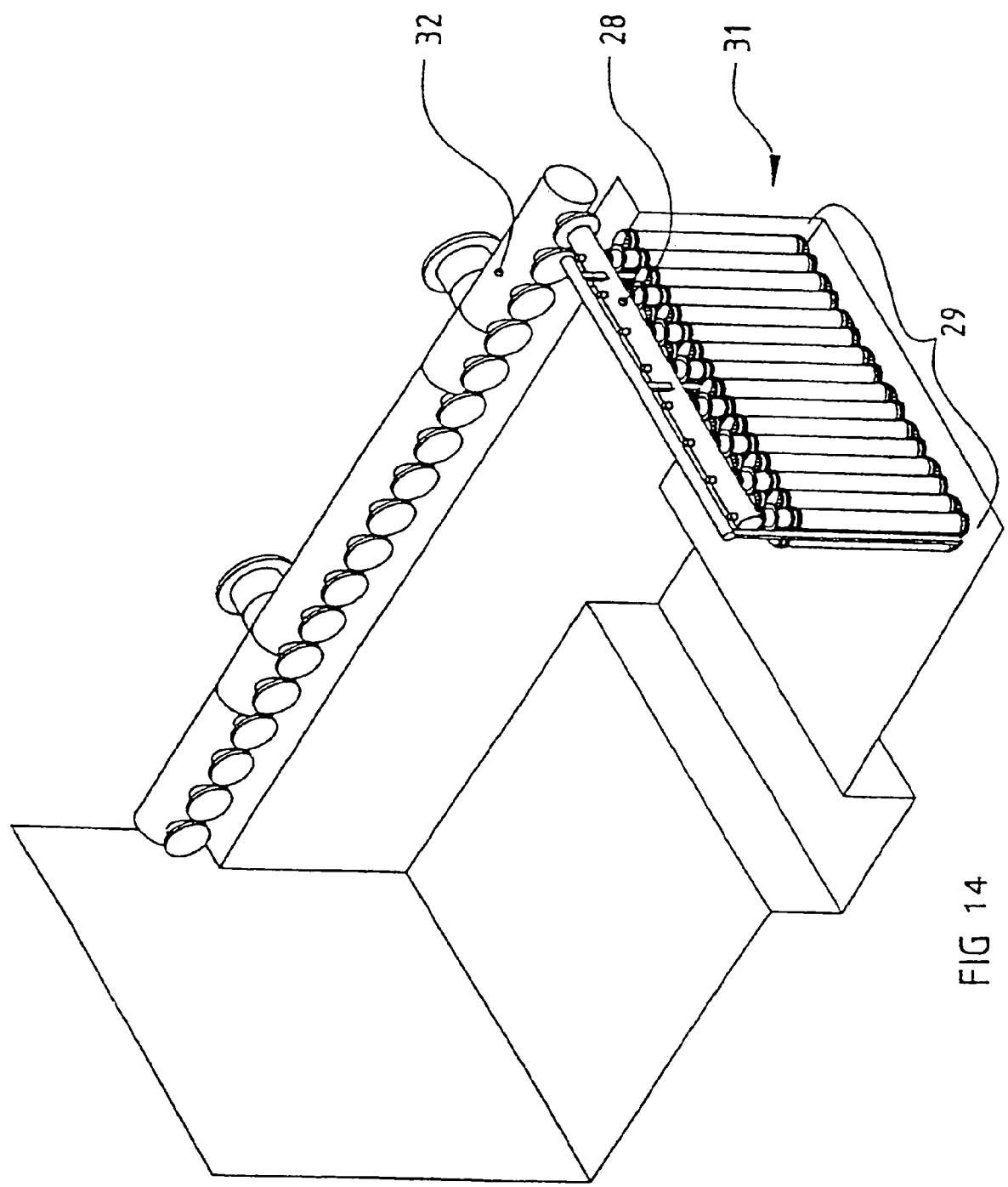
FIG. 14 is a perspective view showing one membrane filtration apparatus bank in a membrane filtration apparatus array.
Figure 15:
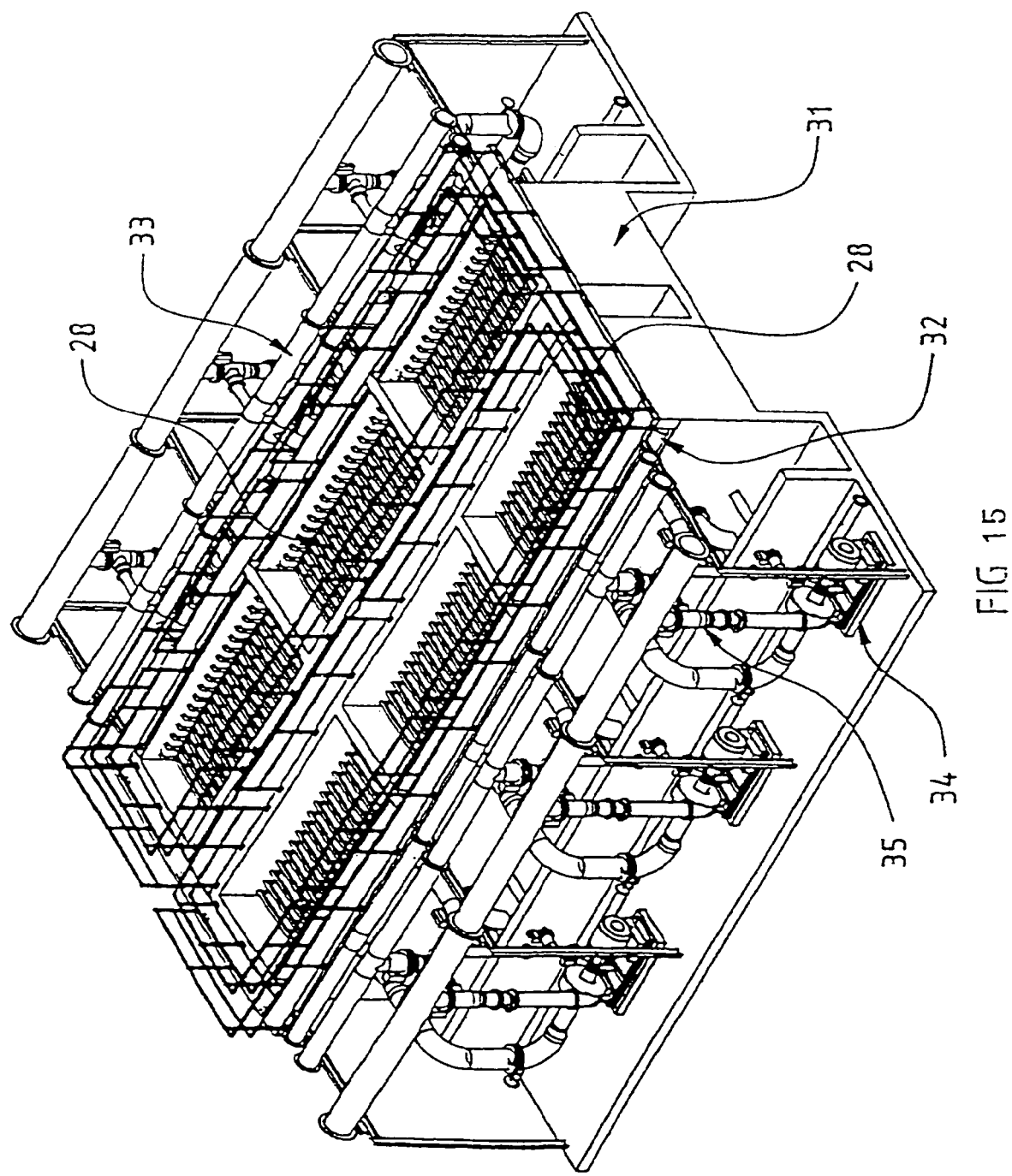
FIG. 15 is an isometric view of a membrane filtration apparatus train.

In a further embodiment of the invention, a membrane filtration array train, as best shown in FIG. 15, includes a plurality of membrane filtration apparatus arrays from FIG. 14 wherein the array filtrate conduits 32 are connected by a train conduit 33 such that the array filtrate conduits 32 are in fluid communication with the train conduits 33.

During filtration the tanks 31 are continuously substantially filled with feed which in turn submerges the arrays of filter submodules 2. Pumps 34 draw the feed through the filter submodules 2 producing filtrate. The filtrate under negative pressure from the pumps 34, travels through the manifolds 1, via the filtrate conduits 28, array filtrate conduits 32, and train filtrate conduits 33 and on to the pump. The filtrate then leaves the pump and also the filtration system via a filtrate exit conduit 35.

Although the invention has been described with reference to specific examples and to filtration manifolds used in filtration systems open to atmosphere, it will now be appreciated by those skilled in the art that the invention may be embodied in many other forms including filtration manifolds used in filtration systems closed to atmosphere.

What is claimed is:

1. A membrane filtration system for connecting a filter submodule comprising one or more elongate bundles of semipermeable polymeric fibers, said system comprising:
   a housing;
   at least one submodule comprising an elongate bundle of semipermeable polymeric fibers attached to a connecting sleeve having a locking formation;
   at least one submodule connecting collar connected with said housing, said collar constructed and arranged to receive and locate the connecting sleeve, said collar releasably secured to the sleeve at an end by a snap clip, which axially and slidingly engages both said collar and said locking formation and at least in part surround both said collar and said locking formation to prevent axial withdrawal of said submodule from said collar, wherein the clip is resiliently biased to enable radial contraction of the clip when the clip engages with the submodule and the collar.

2. The manifold according to claim 1, wherein said housing is in fluid communication with said collar.

3. The manifold according to claim 1, wherein said collar has an internal stepped seat for bearing engagement with said end of said submodule.

4. The manifold according to claim 1, wherein said locking formation comprises a radially outwardly directed circumferential flange formed on said sleeve.

5. The manifold according to claim 1, wherein said side wall comprises a bottom radially inwardly directed circumferential flange at or adjacent the bottom of said side wall for bearing engagement with a complementary step on said collar.

6. The manifold according to claim 1, comprising four submodule connecting collars.

7. The manifold according to claim 6, wherein said collars are disposed in a common plane and have parallel axes.

8. A membrane filtration system comprising:
a first housing;
a plurality of submodules, wherein each submodule comprises:
an elongate bundle of fibers; and
a first connecting sleeve positioned about the bundle of fibers at one end of the bundle of fibers, wherein the sleeve comprises a locking formation;
a plurality of first collars attached to the first housing, wherein each of the plurality of first collars is constructed and arranged to receive and locate the first connecting sleeve of one of the plurality of submodules; and
a plurality of resiliently biased snap clips, wherein each clip comprises a sidewall having a split to define opposed wall edges, and wherein each clip is releasably connected to, and axially and slidingly engages with, one of the plurality of first collars and the locking formation of the first connecting sleeve of one of the plurality of submodules, wherein the clip is resiliently biased to enable radial contraction of the clip when the clip engages with the first collar and the first connecting sleeve.

9. The membrane filtration system of claim 8, wherein the clips are releasably connected to one of the plurality of first collars and the first connecting sleeve of one of the plurality of submodules by a snap fit.

10. The membrane filtration system of claim 9, wherein each of the plurality of submodules further comprises a second connecting sleeve positioned about the bundle of fibers at an end of the bundle of fibers opposite the first connecting sleeve.

11. The membrane filtration system of claim 10, further comprising:
a second housing; and
a plurality of second collars attached to the second housing wherein each of the plurality of second collars is constructed and arranged to receive the second connecting sleeve of one of the plurality of submodules.

12. The membrane filtration system of claim 8, further comprising a filtrate conduit fluidly connected to the first housing.

13. The membrane filtration system of claim 9, further comprising a cleaning fluid conduit fluidly connected to the second housing.

14. The membrane filtration system of claim 13, wherein the cleaning fluid conduit is positioned between two pairs of second collars.

15. The membrane filtration system of claim 8, wherein the submodules are arranged in an upright position.

16. The membrane filtration system of claim 8, wherein four first collars are attached to the first housing.

17. The membrane filtration system of claim 8, further comprising an open feed tank.

18. The membrane filtration system of claim 11, further comprising a fluid tight cap attached to the second housing.

19. The membrane filtration system of claim 1, wherein the clip is cylindrical having a side wall having a top and bottom and a split to define opposed wall edges, the clip further comprising a top radially inwardly directed circumferential flange adjacent the top of said wide wall for gearing engagement with said locking formation on said sleeve.

20. The membrane filtration system of claim 19, wherein the clip further comprises projections on said side wall adjacent respective side opposed edges, wherein said projections extend longitudinally from said top flange.

* * * * *